United States Patent Office 3,343,149
Patented Sept. 19, 1967

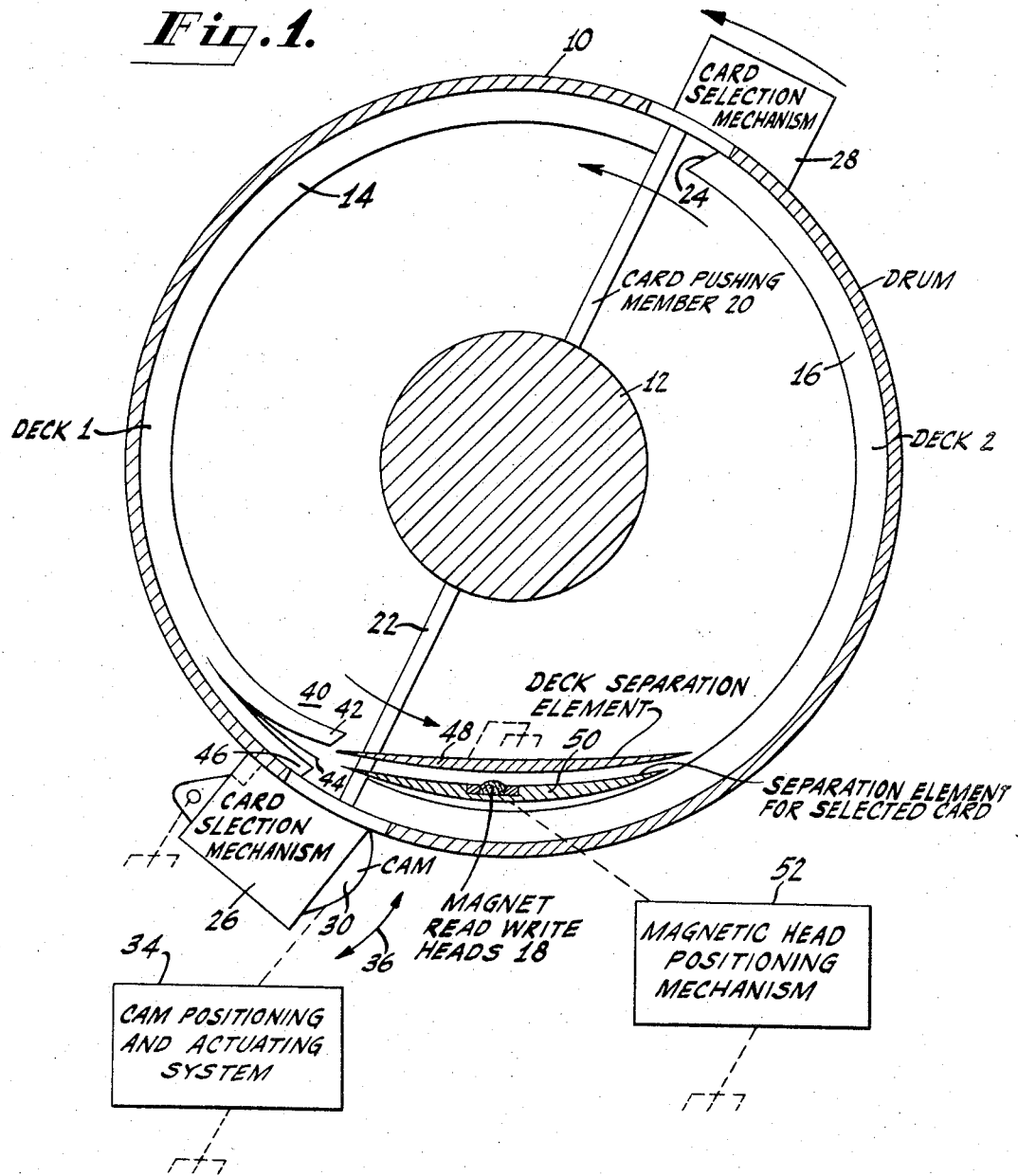

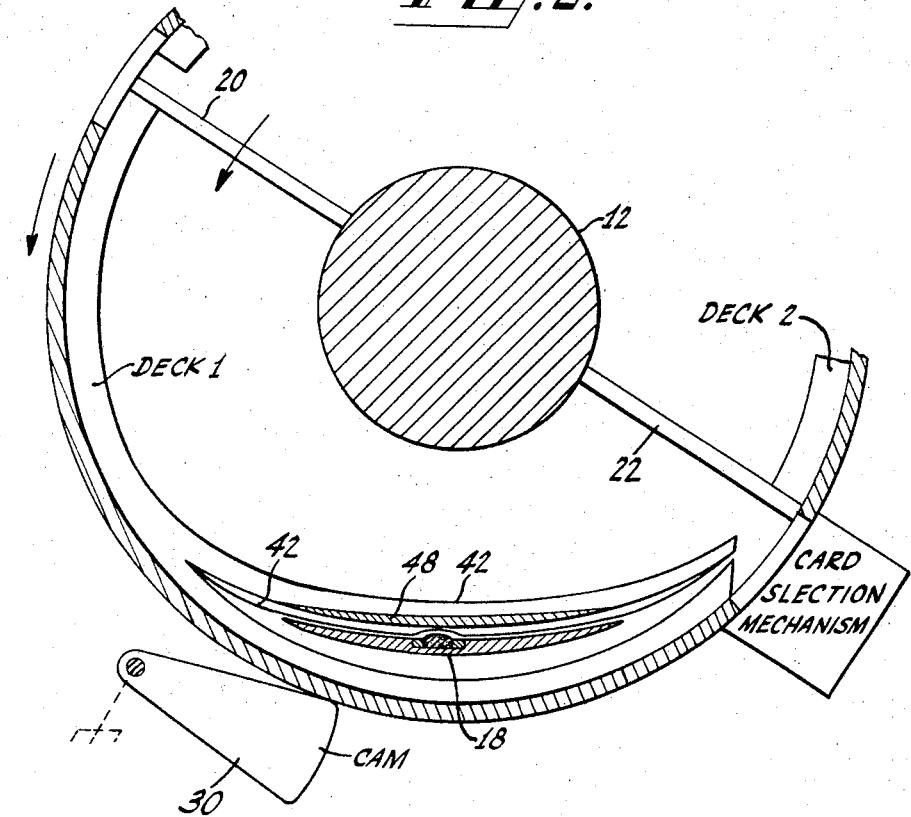

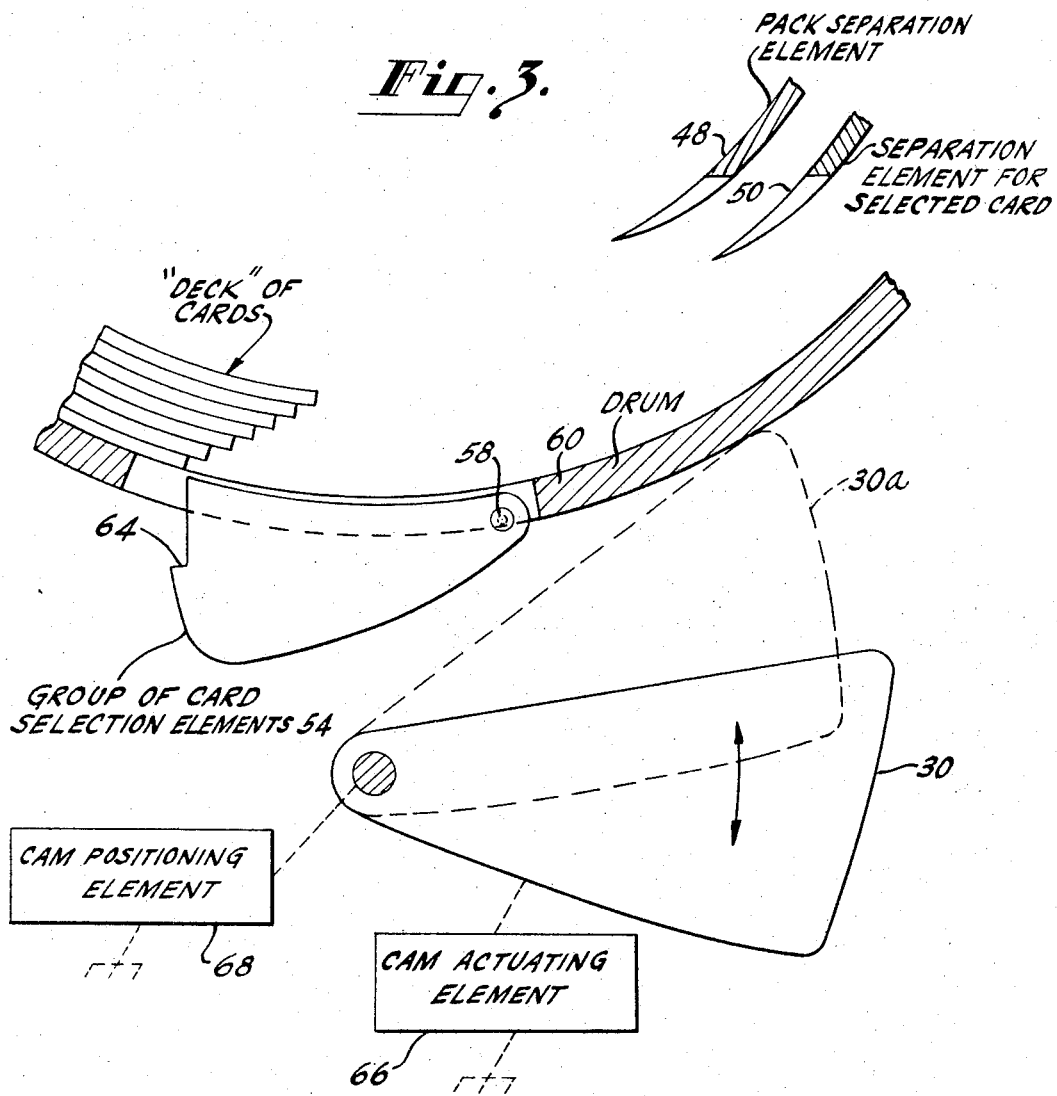

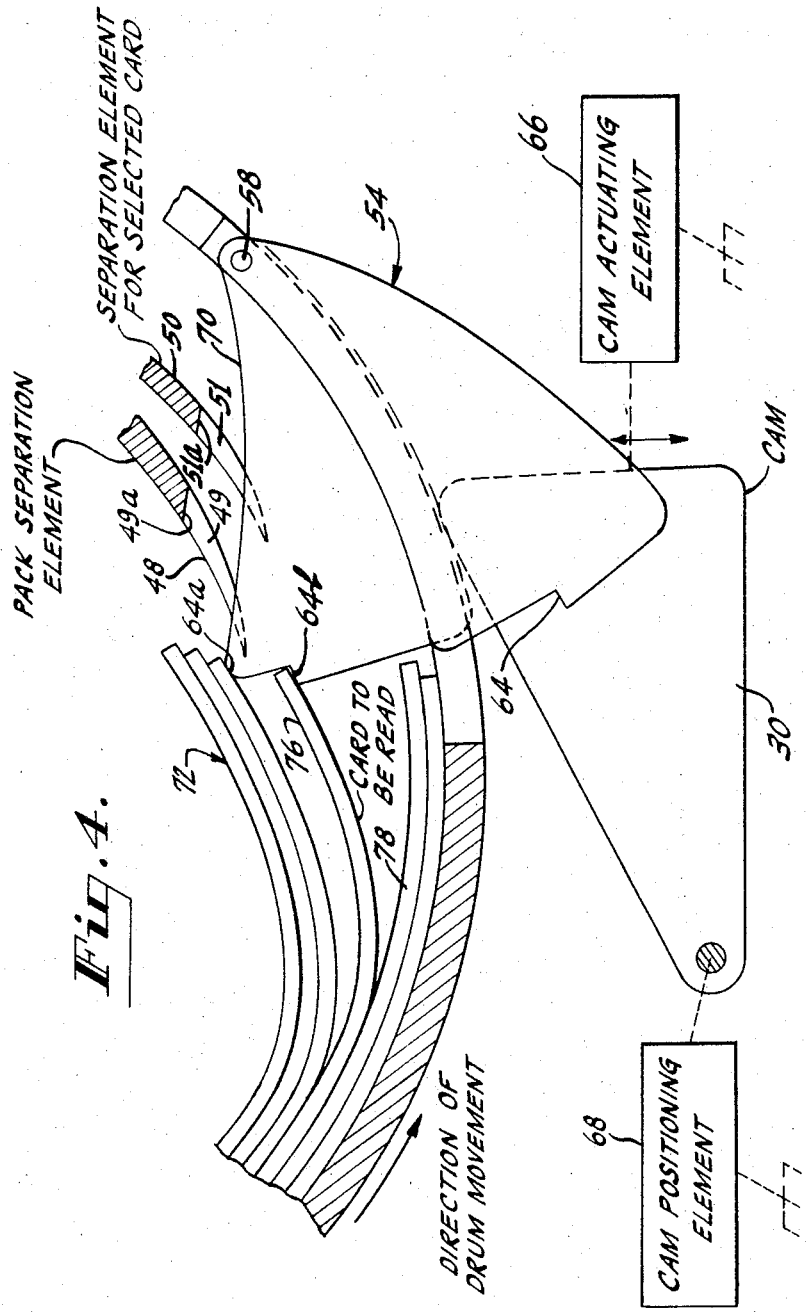

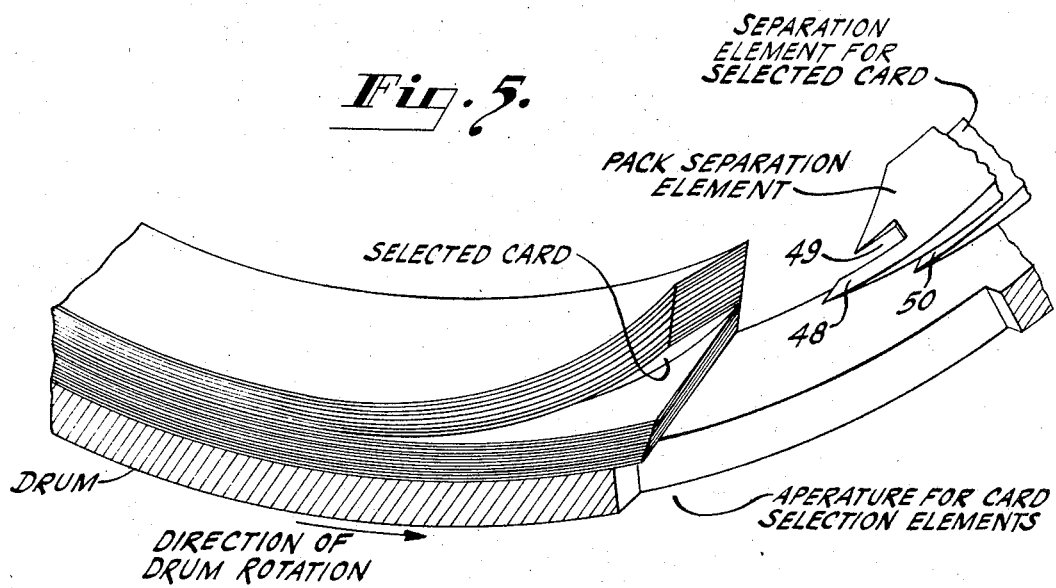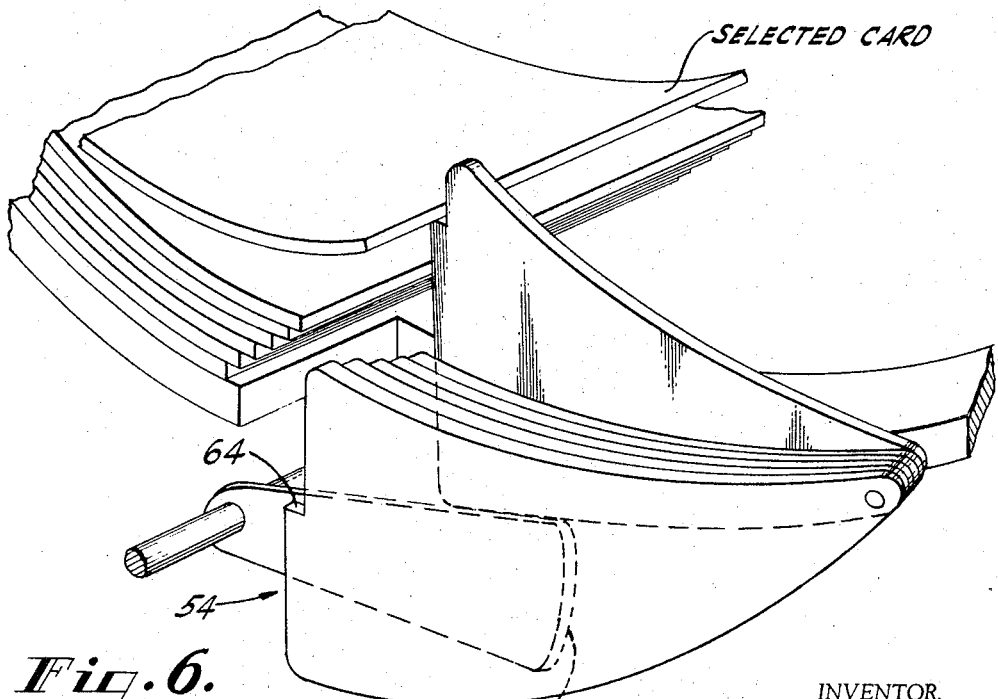

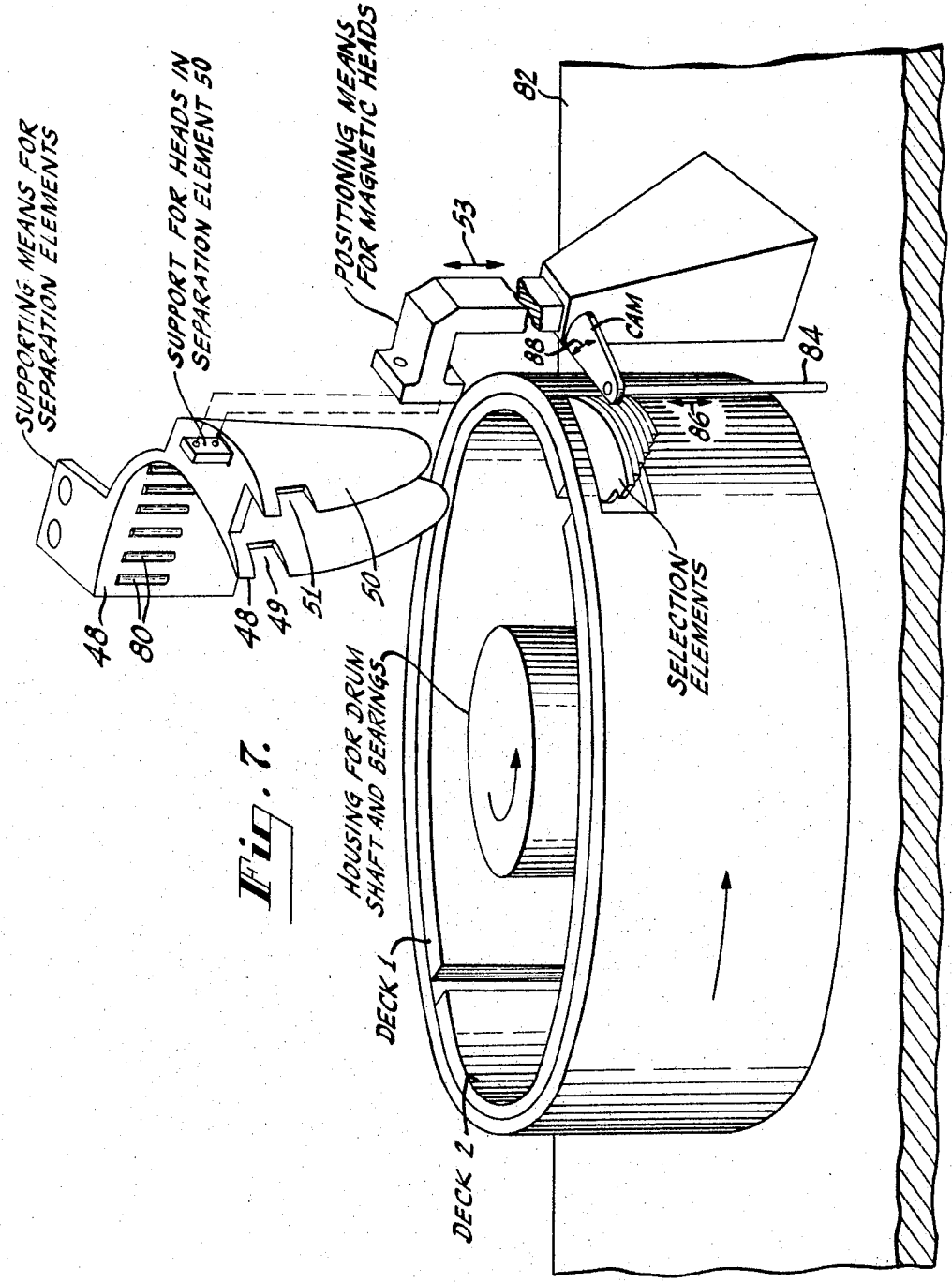

3,343,149
ROTATING RANDOM ACCESS CARD
SELECTION SYSTEM
Lewis W. Bleiman, Northridge, Calif., assignor to Radio Corporation of America, a corporation of Delaware
Filed May 19, 1964, Ser. No. 368,565
11 Claims. (Cl. 340—174.1)

This invention relates to information storage and retrieval, and particularly to improved card memory systems.

A number of systems have been proposed, and some are commercially available, for storing information on cards. Some are serial in nature and are relatively slow because of the time required to "access" the cards. If there is information of interest on, say, the 50th card in a pack, it is necessary to remove the first 49 cards before the 50th one may be processed.

In a more up-to-date system, the cards are stored in magazines and any card in any magazine is randomly accessible. Card selection is achieved by means of selector bars which engage binary coded tabs (or notches) at the edges of the cards. The selection of a card may entail pushing one card in one magazine out of the magazine and retaining all others in the magazine. The selected card may then be mechanically grasped and withdrawn from the pack. Alternatively, all cards except the desired one may be held in place in a magazine and the desired card removed by vibrating the magazine, by magnetic means, by gravity, or in other fashion.

In the randomly accessible card selection systems discussed above, after a card is selected and withdrawn from the magazine, it must travel a substantial distance to the read-write station where information is read from or written onto the card. Thereafter, the card must be returned to the magazine from which it was withdrawn. While the randomly accessible card systems are much faster than the serially accessible card systems, even higher operating speeds are desired in many applications.

The object of the present invention is to provide a card system which is relatively inexpensive and which is substantially faster than the card systems discussed above.

In the card system of the invention, a deck of resilient cards, deformed so that opposite surfaces of the deck lie in parallel cylindrical planes, is continuously rotated about the central axis of these planes. A selector means rotates with the cards and is capable of separating one or more of the cards in the deck from the remaining cards therein at the leading edge portion of the deck. A card separation means which remains fixed relative to the rotating deck of cards is positioned to pass between those cards separated from the deck and the remaining cards therein, as the deck moves past the separation means. And, as the cards continue to be driven, the separated part of the deck moves over the separation means and returns to the remainder of the deck. The separation means includes the heads for reading information from or writing information on one of the cards passing over the separation means.

The invention is discussed in greater detail below and is shown in the following drawings, of which:

FIGURE 1 is a block and cross-sectional showing of one form of the present invention;

FIGURE 2 is a cross-sectional showing of a portion of the arrangement of FIGURE 1 sometime later in the card selection cycle;

FIGURE 3 is a cross-sectional view of a portion of the present system showing details of one form of card selection system;

FIGURE 4 is a view similar to the one of FIGURE 3, but later in the selection cycle;

FIGURE 5 is a perspective showing of other details of the card selection process;

FIGURE 6 is a perspective view showing additional details of the card selection system; and FIGURE 7 is a perspective view which shows certain of the mechanical details of one form of the system according to the invention.

FIGURE 1 shows a hollow drum 10 which is fixed to and driven by the central shaft 12. For purposes of illustration, two packs or "decks" of cards 14 and 16 are shown within the drum. In one particular system, the cards are formed of Mylar and are coated on one of their outer surfaces (the surface facing the drum) with magnetic material. Each card is roughly 16" x 4.5". Binary information is written on (or read from) the cards by means of magnetic read-write heads 18 along parallel tracks extending in a direction parallel to the long dimension of the cards. In FIGURE 1, the long dimension of the cards is in the circumferential direction of the drum. The different tracks on which information may be written are also circumferential and lie one beneath the other. There may be 16 magnetic read-write heads 18, only one of which is visible in FIGURE 1, the remaining heads extending in a direction into the paper.

In a preferred system in which card selection is achieved by binary coded card selection elements, there may be 32, 64, 128 or some other number $2^n$ of cards in each of the packs 14 and 16. However, for purposes of simplifying the discussion, a simplified card selection mechanism, which has six selector elements (one per card) and a pack having only six cards, is shown in a number of the following figures. Each pack of cards is held in place, during rotation, by the centrifugal force which results from the drum rotation. The back edges of the cards are aligned radially and circumferentially by card-pushing members 20 and 22 which engage the back edges of the respective decks of cards. The front edges of the cards, such as 24, extend at an angle to the drum radius. This angle is preferably accentuated somewhat by making the cards of slightly different lengths, those closer to the center being of successively longer lengths. This is to aid in the card selection, as will be explained in more detail later. In the rest position, the cards may be held in place by a narrow curved member somewhat shorter in length than the card and adjacent to one of the long edges of the inner card in each deck. The member may be moved above the adge of the card by means of a solenoid or the like, so that it is free of the deck, after the drum starts rotating. To simplify the drawing, this member is not shown.

The card selection mechanism is illustrated in FIGURE 1 by blocks 26 and 28. The mechanism is actuated by a cam element 30. The cam element is fixed to the frame on which the drum rotates. The card selection mechanisms 26 and 28 are mounted to the drum and rotate with the drum.

The cam 30 is shown in its actuated position. The cam is controlled by a cam actuating mechanism 34. One portion of the actuating mechanism moves the cam toward or away from the drum axis as indicated by arrows 36. Another portion of the cam actuating mechanism moves the cam in a direction in and out of the paper in FIGURE 1. A more detailed explanation of a card selection mechanism and its interaction with the cam is given later.

In the operation of the system of FIGURE 1, when one of the card selection systems is actuated, it causes one of the packs of cards to separate at the leading edge of the pack in the manner shown at 40. An inner portion 42 of the deck is moved toward the axis of the drum. The single, selected card 44 which is next to portion 42 of the deck is separated from portion 42 and from the remainder of the deck 46 by an element 48. As the drum rotates, the inner portion 42 of the deck moves into engagement with the deck separation element 48 and rides over this separation element. The selected card 44 rides over the separation element 50. A plurality of read-write heads are located at the center portion of this element 50. Therefore, as the drum rotates, the selected card moves over the read-write heads and information may be written on a plurality of the tracks on the selected cards.

A showing of the arrangement of FIGURE 1 somewhat later in its cycle appears in FIGURE 2. A portion 42 of the deck is over the card separation element 48 and the leading edge of the portion 42 of the deck is rejoined to the remainder of the deck. The selected card 44 has moved a distance of about ¼ of its length over the read-write heads 18. The magnetic oxide coated surface of this card is adjacent to the read-write heads. The card is held in place against the read-write heads by centrifugal force. However, in a preferred form of the system, slots may be formed on each side of the read-write heads and a vacuum created at the slots for holding the card in intimate contact with the heads during the reading and writing operations. Or, an arrangement may be employed in which the selected card is forced to move between a pressure pad and the read-write heads.

The magnetic heads 18 are preferably equally spaced from one another and extend across a substantial portion of the width of the card. If there are 16 heads, as is the case in a preferred system, then 16 tracks may be written on or read from the card concurrently. After a card from the first deck is processed, the card selection mechanism for the second deck may be actuated by the cam 30 to select any card desired in the second deck. The procedure is the same as already discussed.

Returning for a moment to FIGURE 1, the magnetic read-write heads 18 may be positioned in a direction parallel to the drum axis by the magnetic head positioning mechanism 52. The latter may consist of an electromagnetic or a pneumatic discrete positioning device which can place the heads in any one of, for example, 16 discrete positions. Such devices are commercially available. The heads may be mounted in a channel in element 50 and may be movable relatively to the element 50. The direction of head movement is shown by arrows 53 in FIGURE 7. With 16 heads positionable in 16 different positions, 256 tracks may be processed in the 16 passes of a card. It is preferable that track interlacing be employed. In other words, during one pass, tracks 0, 16, 32, 64 and so on, may be processed. During the next pass, tracks 1, 17, 33, 65 and so on, may be processed. During the next pass, tracks 2, 18, 34, 66 and so on, may be processed, etc. Of course, the group of 16 tracks may be accessed in any order. The tracks desired are selected by applying a four-bit binary word to the positioning mechanism.

FIGURE 3 shows in somewhat more detail the parts of the card selection system. These include a group of six card selection elements 54, only one of which is visible in FIGURE 3. The elements are mounted on a pivot pin 58 which is fixed to the wall 60 of the drum. Each of the elements is formed with a corner 64 to mate with the edge of its respective card, as is discussed shortly.

The cam 30 is shown in its retracted position. It is movable from the position shown to a second position close to the drum, as indicated by dashed lines 30a. This movement may be effected by a cam actuating element 66, such as a solenoid or the like. The cam 30 may also be moved in a direction in and out of the paper by cam positioning element 68. The latter may be a binary coded discrete positioning device similar to the one employed to move the read-write heads, as already discussed.

Six cards are shown in the deck in FIGURE 3. The leading edge of each card overlaps the leading edge of the card immediately below, as is clear from the figure. The overlap is increased by making the inner cards longer than the outer cards. This increase in overlap permits the corner 64 more positively to engage the desired card.

In the operation of the arrangement of FIGURE 3, first the cam is positioned by elements 68 so that it is in the same plane as a desired one of the group of six card selection elements 56. Then the cam actuating element 66 is energized to cause the cam to move toward the drum, as indicated by dashed lines 30a. As the drum rotates, the cam engages one of the card selection elements 54 and forces it toward the center of the drum, along the drum radius, as is shown in FIGURE 4. In FIGURE 4, the third card selection element 70 has been engaged by the cam 30 and forced toward the drum axis. The movement of element 70 has caused the corner 64a thereof to engage the three top cards 72 in the pack and to force these cards toward the center of the drum. Also, the card 76 has been engaged by the corner 64b of card selection element 70. The remaining two cards 78 remain undisturbed.

The pack separation element 48 and the separation element 50 for the selected card remain stationary with respect to the movement of the drum and card. However, as the drum moves, the three upper cards 72 pass over the inner surface of the pack separation element 48 and the selected card 76 passes over the separation element 50. The latter, it will be recalled, contains the read-write heads.

The group of selection elements 54 are located close to the upper edge of the cards. Notches 49 and 51 (see FIGURE 7 also) in the separation elements 48 and 50, respectively, permit the selection element to remain clear of the separation elements until the cards engage the separation elements. However, as soon as the drum has moved the selection elements beyond the cam 30, centrifugal force and the action of shoulders 49a and 51a cause the element 70 to move outwardly with respect to the drum axis to its retracted position, shown in FIGURE 3. A perspective view showing additional details of how the card is selected appears in FIGURE 5. To simplify the drawing, the selector elements 54 are not shown. Note that the pack separation elements 48 and 50 are formed with somewhat pointed leading edges to facilitate engagement with the upper part of the deck and the selected card, respectively.

A perspective exploded view of a portion of the system of the invention appears in FIGURE 7. Elements corresponding in function to those already discussed have similar reference numerals applied. In addition, the embodiment of FIGURE 7 includes rollers 80, both on the inner surface of the pack separation element 48 and the inner surface of the selected card separation element 50. This reduces the friction on the cards and enables the system to operate at somewhat higher speeds.

The cam positioning and actuating elements (68 and 66 of FIGURE 3) are mounted below the supporting surface 82. The element 68 moves the shaft 84 in the direction of arrows 86. The cam actuating element 66 (FIGURE 3) rotates the shaft 84 (FIGURE 7) so as to move the cam in the direction of arrows 88.

While in the embodiment of the invention illustrated, card selection is achieved by moving cards toward the axis of rotation of the drum, it is possible to space the cards from the inner surface and to select a card by causing a group of cards to be displaced outwardly toward the inner surface of the drum. One advantage of operating in this way is that the centrifugal forces aid in the selection of a card.

It should be appreciated that a number of alternative forms of the invention are possible. As one example, in the embodiment illustrated, a single cam is employed which is movable in any one of a number of different positions in a direction parallel to the drum axis. Operating speed may be improved by employing instead a number of cams 30, one for each selection element. In an arrangement of this type, a selection element may be actuated simply by rotating a selected one of the cams inwardly toward the drum about the shaft 84 of FIGURE 7. Movement of the cams in a direction parallel to the drum axis is not required.

In a presently available relatively high-speed card memory system in which the cards are randomly accessible, it is possible to select approximately three cards per second. With the system of the type described herein, using diametrically opposed heads, a drum rotational speed of 720 revolutions per minute, and a drum having a diameter of 16 inches, selection rates of 24 cards per second are feasible.

What is claimed is:

1. In a card memory system,
   means for continuously rotating a deck of cards, said deck being deformed so that the opposite surfaces of the deck lie in parallel cylindrical planes, said deck being rotated about the axis of said planes, whereby the deck moves in a cylindrical path concentric with said axis;
   a read-write station; and
   means for deflecting a card from its cylindrical path to a path which passes through the read-write station and then returns to said cylindrical path.

2. In a card memory system,
   means for continuously rotating a deck of cards, said deck being deformed so that the opposite surfaces of the deck lie in parallel cylindrical planes, said deck being rotated about the axis of said planes, whereby the deck moves in a cylindrical path concentric with said axis;
   a read-write station;
   means for separating the leading edge of one card from the leading edge of the cards in the remainder of the deck during the rotation of the deck; and
   means for deflecting the separated card from its cylindrical path to a path which passes through the read-write station.

3. In a card memory system,
   means for continuously rotating a deck of cards, said deck being deformed so that the opposite surfaces of the deck lie in parallel cylindrical planes, said deck being rotated about the axis of said planes, whereby the deck moves in a cylindrical path concentric with said axis;
   a read-write station;
   means for separating the leading edge of one card from the leading edge of the cards in the remainder of the deck during the rotation of the deck; and
   means for deflecting the separated card from its cylindrical path to a second path, this one inside of the cylindrical path, passing through the read-write station and then back to a point in said cylindrical path reached by the deck during the movement of the selected card through the second path.

4. In a card memory system,
   means for continuously rotating a deck of cards, said deck being deformed so that the opposite surfaces of the deck lie in parallel cylindrical planes, said deck being rotated about the axis of said planes; and
   means for stripping from the deck a desired one of the cards, reading information therefrom, and returning it to the rotating deck, all as the deck is moving past said means.

5. In a card memory system,
   means for continuously rotating a deck of cards, said deck being deformed so that the opposite surfaces of the deck lie in parallel cylindrical planes, said deck being rotated about the axis of said planes;
   means for separating the leading edge of a group of the cards, and the leading edge of a single card from the remainder of the deck, during the rotation of the deck about said axis;
   first and second alternate paths which start at one portion of the path defined by the cylindrical planes, and end at another portion of the path defined by said planes;
   means for stripping from the deck, during the rotation of the deck about said axis, the group of cards and passing them through the first path, and the single card and passing it through the second path; and
   a read-write station in the second path for reading information from or writing information on the single card as it passes through the second path.

6. In a card memory system,
   means for continuously rotating a deck of resilient cards, said deck being deformed so that the opposite surfaces of the deck lie in parallel cylindrical planes, said deck being rotated about the central axis of said planes;
   selector means rotatable with the deck of cards for separating at least one of the cards in the deck from the remaining cards in the deck at the leading edge portion of the deck; and
   card separation means which remain fixed relative to the rotating deck of cards positioned to pass beneath a card separated from the deck by the selector means and to remove said card from the deck as the deck is rotated past the separation means.

7. In a card memory system,
   means for continuously rotating a deck of magnetic cards, said deck being deformed so that the opposite surfaces of the deck lie in parallel cylindrical planes, said deck being rotated about the central axis of said planes;
   selector means rotatable with the deck of cards for separating at least one of the cards in the deck from the remaining cards in the deck at the leading edge portion of the deck;
   card separation means which remain fixed relative to the rotating deck of cards positioned to pass beneath a card separated from the deck by the selector means and to remove said card from the deck as the deck is rotated past the separation means; and
   a plurality of magnetic recording heads positioned in the card separation means and positioned to couple to the separated card as it moves over the card separation means.

8. In a card memory system,
   a hollow drum having an inner circumferential surface;
   a deck of cards within the drum deformed to conform in shape to said inner surface and held to said inner surface as the drum rotates;
   card selection means fixed to the drum for separating one or more cards in the deck from the remaining cards in the deck at the leading edge portion of the deck; and
   deck separation means within the drum which remains relatively stationary with respect to the rotation of the drum, positioned to engage and remove the cards separated at their leading edge from the remainder of the deck from the deck, as the deck of cards rotates past the card separation means.

9. In a card memory system,
   a hollow drum having an inner circumferential surface;
   a deck of cards within the drum deformed to conform in shape to said inner surface and held to said inner surface by centrifugal force as the drum rotates;
   means, including a plurality of elements movably mounted to the drum and cam means movably mounted to the support on which the drum rotates for actuating a desired one of said elements, for separating one or more cards in the deck from the remaining cards in the deck at the leading edge portion of the deck; and
   deck separation means within the drum which remains relatively stationary with respect to the rotation of the drum, positioned to engage and remove the cards separated at their leading edge from the remainder of the deck from the deck, as the deck of cards rotates past the card separation means.

10. In a card memory system,
a hollow drum having an inner circumferential surface;
a deck of cards within the drum deformed to conform in shape to said inner surface and held to said inner surface by centrifugal force as the drum rotates;
card selection means fixed to the drum for pushing a group of the cards in the deck toward the drum axis and away from the remaining cards in the deck at the leading edge portion of the deck; and
deck separation means comprising a planar member within the drum which remains relatively stationary with respect to the rotation of the drum positioned to pass beneath, engage and remove the group of cards separated at their leading edge from the remainder of the deck from the deck, as the deck of cards rotates past the card separation means.

11. In a card memory system,
a hollow rotatable drum having an inner circumferential surface;
a deck of cards within the drum deformed to conform in shape to said inner surface and held to said inner surface by centrifugal force as the drum rotates;
card selection means fixed to the drum for pushing a group of cards, and a single card beneath the group of cards, toward the drum axis and away from the remaining cards in the deck at the leading edge portion of the deck;
first and second separation means within the drum which remain relatively stationary with respect to the rotation of the drum, said first means positioned to engage and remove the group of cards and said second means positioned concurrently to engage and remove the single card as the deck of cards rotates past the card separation means; and
read-write means operatively associated with said second means for reading information from or writing information on the single card as it passes over said second means.

References Cited
UNITED STATES PATENTS

| | | | |
|---|---|---|---|
| 2,658,513 | 11/1953 | Clough et al. | 129—16.1 |
| 3,014,093 | 12/1961 | Zenner | 129—16.1 X |
| 3,176,279 | 3/1965 | Lin et al. | 340—174.1 |

BERNARD KONICK, *Primary Examiner.*

A. I. NEUSTADT, *Assistant Examiner.*